(12) United States Patent
Stroope et al.

(10) Patent No.: US 11,512,771 B2
(45) Date of Patent: Nov. 29, 2022

(54) TRANSFER CASE WITH PRIMARY SHAFT HAVING INCLINED FLUID CHANNELS

(71) Applicant: BorgWarner Inc., Auburn Hills, MI (US)

(72) Inventors: Susan Stroope, Oxford, MI (US); Arun Narayanan, Rochester Hills, MI (US); Yogesh Mehta, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 797 days.

(21) Appl. No.: 15/982,342

(22) Filed: May 17, 2018

(65) Prior Publication Data

US 2018/0335124 A1 Nov. 22, 2018

Related U.S. Application Data

(60) Provisional application No. 62/507,411, filed on May 17, 2017.

(51) Int. Cl.
| | |
|---|---|
| *F16H 57/00* | (2012.01) |
| *F16H 57/04* | (2010.01) |
| *F16C 3/02* | (2006.01) |
| *B60K 17/344* | (2006.01) |
| *F16H 57/05* | (2006.01) |
| *B60K 17/35* | (2006.01) |
| *B60K 23/08* | (2006.01) |

(52) U.S. Cl.
CPC ......... *F16H 57/043* (2013.01); *B60K 17/344* (2013.01); *B60K 17/35* (2013.01); *B60K 23/0808* (2013.01); *F16C 3/02* (2013.01); *F16H 57/05* (2013.01); *F16C 2326/06* (2013.01)

(58) Field of Classification Search
CPC .... F16H 57/043; F16H 57/05; F16H 57/0431; F16H 57/0426; F16H 2057/02052; B60K 17/35; B60K 23/0808; B60K 17/344; F16C 3/02; F16C 2326/06
USPC .......................................... 74/467; 192/113.3
See application file for complete search history.

(56) References Cited

U.S. PATENT DOCUMENTS

| | | | | |
|---|---|---|---|---|
| 2,487,350 | A * | 11/1949 | Markland | F16H 57/0434 184/11.1 |
| 3,046,813 | A * | 7/1962 | Bixby | B60K 17/344 74/665 GA |
| 3,845,671 | A * | 11/1974 | Sharp | F16H 48/34 475/150 |
| 4,785,682 | A | 11/1988 | Nishimura et al. | |
| 4,883,138 | A * | 11/1989 | Kameda | B60K 17/3467 180/249 |

(Continued)

*Primary Examiner* — Victor L MacArthur
(74) *Attorney, Agent, or Firm* — Young Basile Hanlon & MacFarlane, P.C.

(57) ABSTRACT

A transfer case includes a primary shaft, a secondary shaft radially offset from the primary shaft, and a torque transfer mechanism. The primary shaft includes a central channel and an inclined fluid channel. The torque transfer mechanism is configured to selectively transfer torque from the primary shaft to the secondary shaft, and includes a primary sprocket coupled to the primary shaft for transferring torque to the secondary shaft. The inclined fluid channel is associated with the primary sprocket, and includes an outlet that axially overlaps the primary sprocket.

20 Claims, 9 Drawing Sheets

(56) References Cited

U.S. PATENT DOCUMENTS

| | | | |
|---|---|---|---|
| 5,853,342 A * | 12/1998 | Pritchard | B60K 17/3467 |
| | | | 475/206 |
| 6,325,190 B1 | 12/2001 | Yoshimoto et al. | |
| 6,381,957 B1 | 5/2002 | Hori et al. | |
| 6,565,475 B2 * | 5/2003 | Williams | B60K 17/3467 |
| | | | 180/249 |
| 6,582,331 B1 * | 6/2003 | Baxter, Jr. | B60K 17/344 |
| | | | 474/91 |
| 7,174,996 B2 | 2/2007 | Hori et al. | |
| 2017/0085151 A1 * | 3/2017 | Kuhn | F16C 19/546 |
| 2018/0335124 A1 * | 11/2018 | Stroope | F16H 57/05 |

* cited by examiner

TRANSFER CASE WITH PRIMARY SHAFT HAVING INCLINED FLUID CHANNELS

CROSS-REFERENCE TO RELATED APPLICATION(S)

This application claims the benefit of, and priority to, U.S. Provisional Patent Application Ser. No. 62/507,411, filed on May 17, 2017, the entire content of which is hereby incorporated by reference.

BACKGROUND

Rotating shafts in vehicle powertrain systems (e.g., drive shafts, axles, transmissions, transfer cases, drive assemblies, etc.) are subject torsional loads when transferring torque, such as from an engine to wheels of the vehicle. In certain applications, such rotating shafts may also be subject to bending loads.

Figure 1:
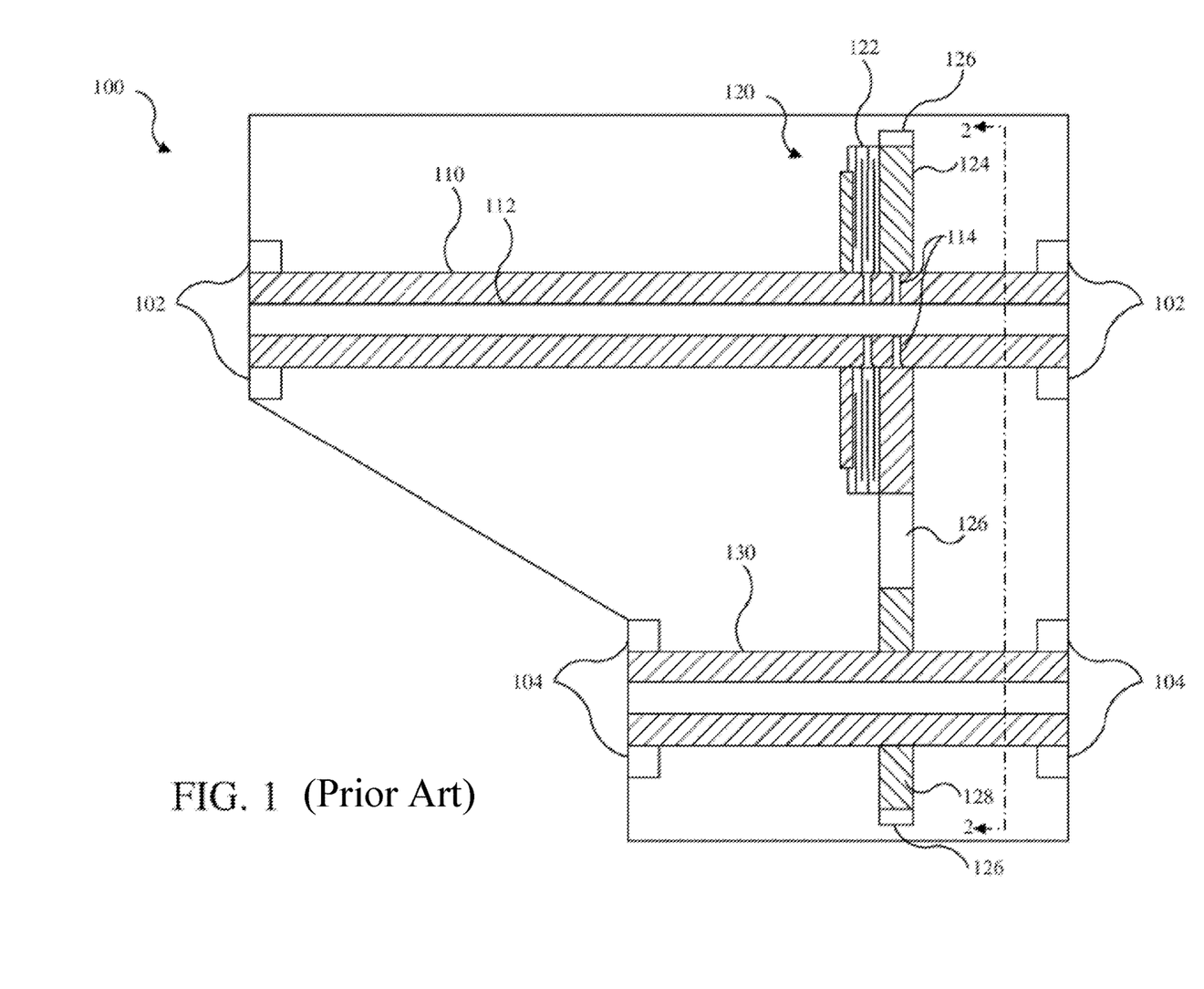
FIG. 1 is a cross-sectional view of a conventional transfer case.

For example, bending loads may be induced on a primary shaft of a transfer case when selectively providing a secondary output. As shown in FIG. 1, a conventional transfer case 100 generally includes a primary shaft 110 and a torque transfer mechanism 120 that selectively transfers torque to a secondary shaft 130. The primary shaft 110 is rotatably supported by bearings 102 that are spaced apart axially along the primary shaft 110. The secondary shaft 130 is similarly supported by bearings 104 at a position radially offset relative to the primary shaft 110. The transfer case 100 may include additional bearings at other locations to further support the primary shaft 110 and the secondary shaft 130 at intermediate axial locations.

The torque transfer mechanism 120 selectively rotatably couples the primary shaft 110 to the secondary shaft 130 to transfer torque therebetween. The torque transfer mechanism 120 generally includes a clutch 122, a primary sprocket 124, a chain 126, and a secondary sprocket 128. The torque transfer mechanism 120 is located at an intermediate axial location between the bearings 102 of the primary shaft 110 and between the bearings 104 of the secondary shaft 130.

The primary sprocket 124 surrounds the primary shaft 110, and is selectively coupled thereto by the clutch 122 to rotate therewith. The secondary sprocket 128 surrounds and is rotatably coupled to the secondary shaft 130 (e.g., via a splined connection). The secondary sprocket is further rotatably coupled to the primary sprocket 124 with the chain 126, such that the secondary sprocket 128 rotates in unison with the primary sprocket 124. When the primary shaft 110 is rotated (e.g., by an output of an engine or transmission) and the clutch 122 is engaged (e.g., compressed), torque is transferred from the primary shaft 110 to the secondary shaft 130 by the torque transfer mechanism 120.

Figure 2:
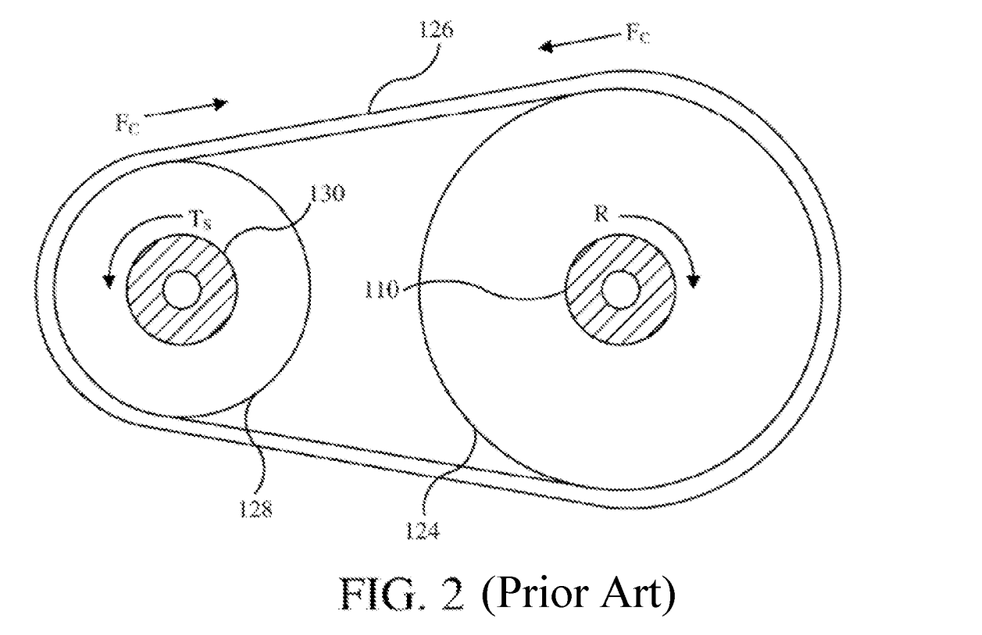
FIG. 2 is a partial cross-sectional view of the transfer case taken along line 2-2 in FIG. 1.

As shown in FIG. 2, when the primary shaft 110 is rotated in a direction R and the torque transfer mechanism 120 is engaged, torque is transferred from the primary shaft 110 to the secondary shaft 130. This torque transfer subjects the primary shaft 110 and the secondary shaft 130 to both torsional and bending loads. More particularly, the torsional load Ts of the secondary shaft 130 (e.g., as the secondary shaft 130 drives front wheels of a vehicle) places the chain 126 in tension between the primary sprocket 124 and the secondary sprocket 128. This force $F_C$ is transferred from the primary sprocket 124 and the secondary sprocket 128 and applied laterally (e.g., in a radial direction) to the primary shaft 110 and the secondary shaft 130.

Figure 3:
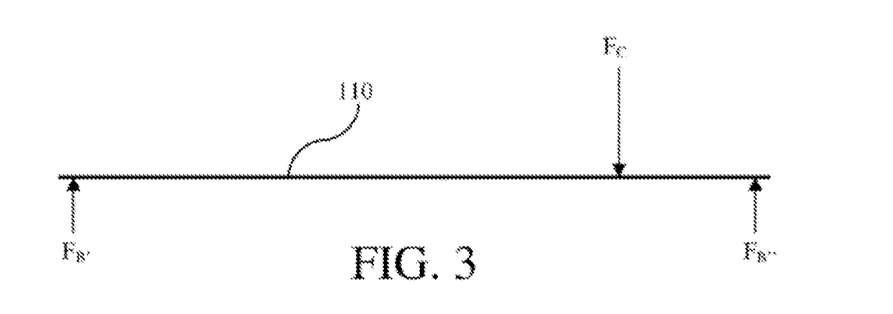
FIG. 3 is a free body diagram of a primary shaft of the transfer case of FIG. 1.
Figure 4:
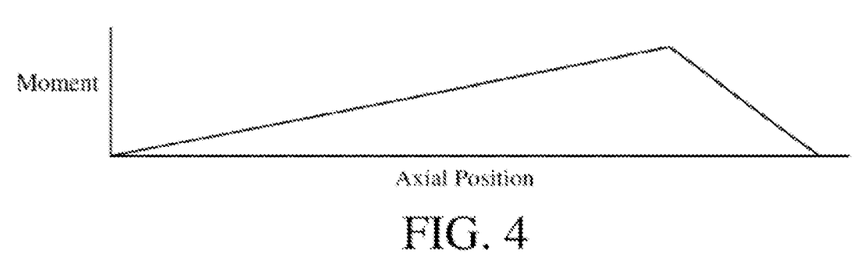
FIG. 4 is a bending moment diagram of the primary shaft of the transfer case of FIG. 1.

As shown in the free body diagram of FIG. 3, the force $F_C$ acting on the primary shaft 110 is countered by reaction forces $F_B'$, $F_B''$ applied in an opposing lateral direction (e.g., radially) to the primary shaft 110 by the bearings 102. This induces a bending moment in the primary shaft 110, which is illustrated in the bending moment diagram of FIG. 4. The maximum or peak bending moment is experienced at the axial location of the primary sprocket 124 on the primary shaft 110 (i.e., the location at which the force $F_C$ is applied to the primary shaft 110). Another bending moment is similarly created on the secondary shaft 130 about the bearings 104.

Bending loads of this type over many cycles may fatigue the primary shaft 110 and/or the secondary shaft 130, which as compared to torsional loads, may more quickly lead to failure of the primary shaft 110 and/or the secondary shaft 130.

As is also shown in FIG. 1, the primary shaft 110 and the secondary shaft 130 may be configured to route and distribute fluid (e.g., oil) for lubricating and/or cooling various components. The primary shaft 110 includes a central conduit 112 and one or more perpendicular fluid channels 114. The central conduit 112 is concentric with the primary shaft 110, while the perpendicular fluid channels 114 extend perpendicular to a central axis of the primary shaft 110. The central conduit 112 receives fluid from a fluid source (not shown), and routes the fluid radially outward through the perpendicular fluid channels 114 to various components. The perpendicular fluid channels 114 are located in regions where various components interface each other, for example, at the axial location of the clutch 122 and/or the primary sprocket 124. The secondary shaft 130, though not shown, may also include perpendicular fluid channels.

The perpendicular fluid channels 114 are formed by removing material from the primary shaft 110, which may weaken the primary shaft 110 as compared to a similar shaft without the perpendicular fluid channels 114. More particularly, this removal or absence of material increases the stress concentration factor of the primary shaft 110 at the perpendicular fluid channels 114 in both torsion and bending, which can reduce both torsional and bending fatigue life of the primary shaft 110.

SUMMARY

In one aspect of the disclosure, a transfer case is disclosed that includes a primary shaft, a secondary shaft, and a torque transfer mechanism. The primary shaft includes a central channel and an inclined or angled fluid channel that extends transversely in relation to the central channel. The inclined fluid channel is in fluidic communication with the central channel. The torque transfer mechanism is configured to selectively transfer torque from the primary shaft to the secondary shaft and includes a primary sprocket coupled to the primary shaft. The inclined fluid channel is associated with the primary sprocket. An outlet of the inclined fluid channel may overlap the primary sprocket in an axial direction. The torque transfer mechanism may include a clutch adjacent the primary sprocket, which is operable to selectively transfer torque from the primary shaft to the secondary shaft, and the primary shaft may include another fluid channel associated with the clutch.

In another aspect of the disclosure, a transfer case is disclosed that includes a primary shaft, a secondary shaft, and a torque transfer mechanism. The torque transfer mechanism is configured to transfer torque from the primary shaft to the secondary shaft and includes a primary sprocket positioned about the primary shaft. The primary shaft includes an inclined fluid conduit associated with the primary sprocket and oriented at an angle with respect to a central longitudinal axis of the primary shaft. In certain embodiments, the inclined fluid conduit may extend at an angle greater than 20 degrees relative to a plane that is perpendicular in relation to the central longitudinal axis of the primary shaft. In certain embodiments, an outlet of the inclined fluid conduit may axially overlap the primary sprocket.

In another aspect of the disclosure, a drive assembly is disclosed that includes a shaft for transferring torque and distributing fluid. The shaft includes an inclined fluid conduit in a region of the shaft in which peak bending loading occurs. A plane that is perpendicular to the shaft in the region of peak bending loading may pass through the inclined fluid channel. The plane may pass through an outlet but not an inlet of the inclined fluid channel.

In another aspect of the disclosure, a transfer case is disclosed that includes a primary shaft, a secondary shaft, and a torque transfer mechanism. The primary shaft includes a central channel extending along a first axis and a fluid channel extending along a second axis transverse in relation to the first axis. The torque transfer mechanism is configured to transfer torque, for example selectively transfer torque, from the primary shaft to the secondary shaft and includes a sprocket coupled to, and concentric with, the primary shaft. The secondary shaft may be spaced apart radially from the primary shaft.

In certain embodiments, the fluid channel may define an outlet positioned in axial correspondence with the sprocket.

In certain embodiments, the sprocket may define opposing ends spaced axially along the primary shaft. In such embodiments, the outlet defined by the fluid channel may be positioned between the opposing ends of the sprocket. For example, the outlet may be positioned approximately equidistant between the opposing ends of the sprocket.

The second axis extends an acute inclination angle relative to a plane perpendicular to the first axis. In certain embodiments, the acute inclination angle may be greater than approximately 20 degrees. For example, the inclination angle may be between approximately 40 degrees and approximately 50 degrees. In one particular embodiment, the inclination angle may be approximately 45 degrees.

In certain embodiments, the primary shaft may include a first fluid channel and a second fluid channel. In such embodiments, the first and second fluid channels may define identical inclination angles.

In certain embodiments, the first and second fluid channels may be positioned in diametrical opposition with respect to the first axis.

In another aspect of the disclosure, a transfer case is disclosed that includes an output shaft and a torque transfer mechanism in mechanical cooperation with the output shaft. The output shaft defines a central longitudinal axis and includes a fluid conduit having an outlet and extending at an acute inclination angle with respect to a plane perpendicular to the central longitudinal axis. The torque transfer mechanism includes a sprocket defining opposing first and second faces spaced axially along the central longitudinal axis. The output shaft is supported by a first bearing and a second bearing positioned on opposite sides of the sprocket.

In certain embodiments, the inclination angle may be greater than approximately 20 degrees. For example, the inclination angle may be between approximately 40 degrees and approximately 50 degrees.

In certain embodiments, the outlet of the fluid conduit may be positioned between the first and second bearings.

In certain embodiments, the outlet of the fluid conduit may be positioned between the first and second faces of the sprocket. For example, the outlet may be positioned approximately equidistant between the first and second faces of the sprocket.

In certain embodiments, the output shaft may include a first fluid conduit extending at a first acute inclination angle with respect to the plane and a second fluid conduit extending at a second acute inclination angle with respect to the plane. In such embodiments, the first and second inclination angles may be identical.

In certain embodiments, the first and second fluid conduits may be positioned in diametrical opposition with respect to the central longitudinal axis.

In another aspect of the disclosure, a drive assembly is described that includes a shaft for transferring torque and distributing fluid. The shaft includes an inclined or angled fluid channel in a region of peak bending loading of the shaft, which defines an inlet and an outlet spaced axially along the shaft.

In certain embodiments, the shaft may be configured and dimensioned, and the fluid channel may be positioned, such that a plane extending in perpendicular relation to the shaft in the region of peak bending loading passes through the inclined fluid channel.

In certain embodiments, the shaft may be configured and dimensioned, and the fluid channel may be positioned, such that the plane passes through the outlet of the fluid channel but not the inlet of the fluid channel.

BRIEF DESCRIPTION OF THE DRAWINGS

The description herein makes reference to the accompanying drawings, wherein like referenced numerals refer to like parts throughout several views, and wherein.

DETAILED DESCRIPTION

The present disclosure is directed to a primary shaft and a transfer case, gearbox, or other torque transfer device comprising the same. The primary shaft includes one or more fluid channels (e.g., conduits, holes, etc.) that are configured to increase fatigue life of the primary shaft as compared to conventional perpendicular fluid channels. More particularly, the primary shaft includes one or more fluid channels that are inclined or angled (i.e., not perpendicular) relative to the axis of the primary shaft, i.e., such that the fluid channels extend transversely in relation to axis of the primary shaft.

As compared to shafts having the perpendicular fluid channels, a shaft having inclined fluid channels may experience increased bending fatigue life. For example, with the inclined fluid channels, the shaft experiences decreased bending stress intensity and, thereby, increased bending fatigue life.

The inclined fluid channels may cause the shaft to experience increased torsional stress and, thereby, decreased torsional fatigue life. However, in transfer case applications, bending fatigue life is typically shorter than torsional fatigue life. Therefore, a tradeoff of increased bending fatigue life for decreased torsional fatigue life may still result in increased overall fatigue life of the shaft.

Computer simulations and test data indicate that inclined fluid channels can decrease bending stress concentration and increase bending fatigue life, while at the same time increase torsional stress concentration and decrease torsional fatigue life.

Figure 5A:
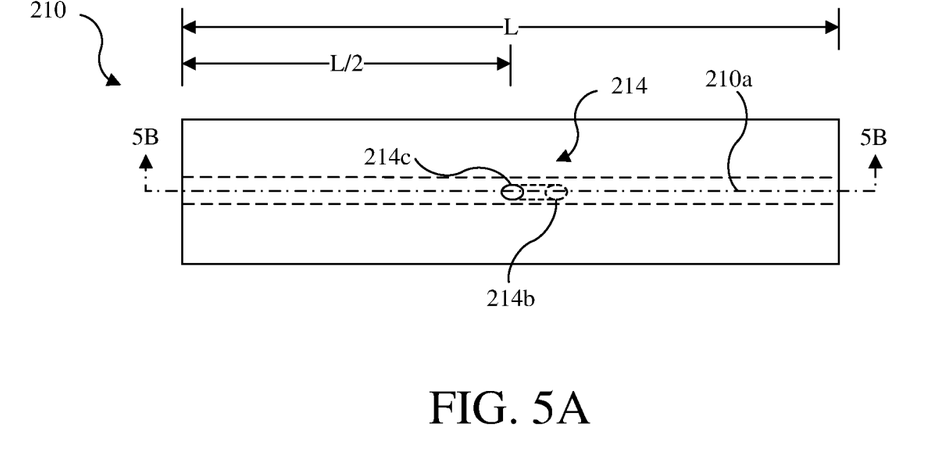
FIG. 5A is a top view of a simulated shaft with hidden features depicted in dashed lines.
Figure 5B:
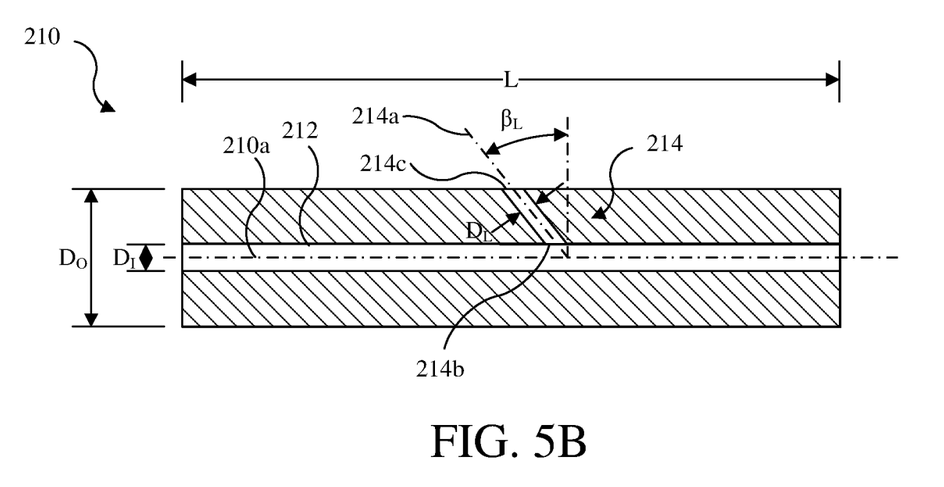
FIG. 5B is a cross-sectional view of the simulated shaft taken along line 5B-5B in FIG. 5A.

Referring to FIGS. 5A-6B, computer simulations were performed for determining the bending stress concentration factor Kb and torsional stress concentration factor Kt on simulated shafts 210 of steel material. As shown in FIGS. 5A-5B, the simulated shafts 210 have a length L of 500 mm, an outer diameter Do of approximately 50 mm, and an inner diameter Di of 12 mm, which forms a central channel 212. The simulated shaft 210 includes a fluid channel 214 having a diameter $D_L$, a central axis 214a, and an inclination angle $\beta_L$ measured between the central axis 214a of the fluid channel 214 and a plane perpendicular to a central axis 210a of the shaft 210. Computer simulations were performed for shafts 210 having fluid channels 214 with diameters $D_L$ of 3 mm and 5 mm and at inclination angles $\beta_L$ of between 0 degrees (i.e., a conventional perpendicular fluid channel) and 45 degrees (for the 5 mm shafts) and 80 degrees (for the 3 mm shafts) in 5 degree increments, i.e., acute inclination angles $\beta_L$ whereby the fluid channels 214 extend transversely in relation to the central axis 210a of the shaft 210. The computer simulations applied either a bending load of 1 kN at L/2, or a torsional load of 1000 N-m.

Figure 6A:
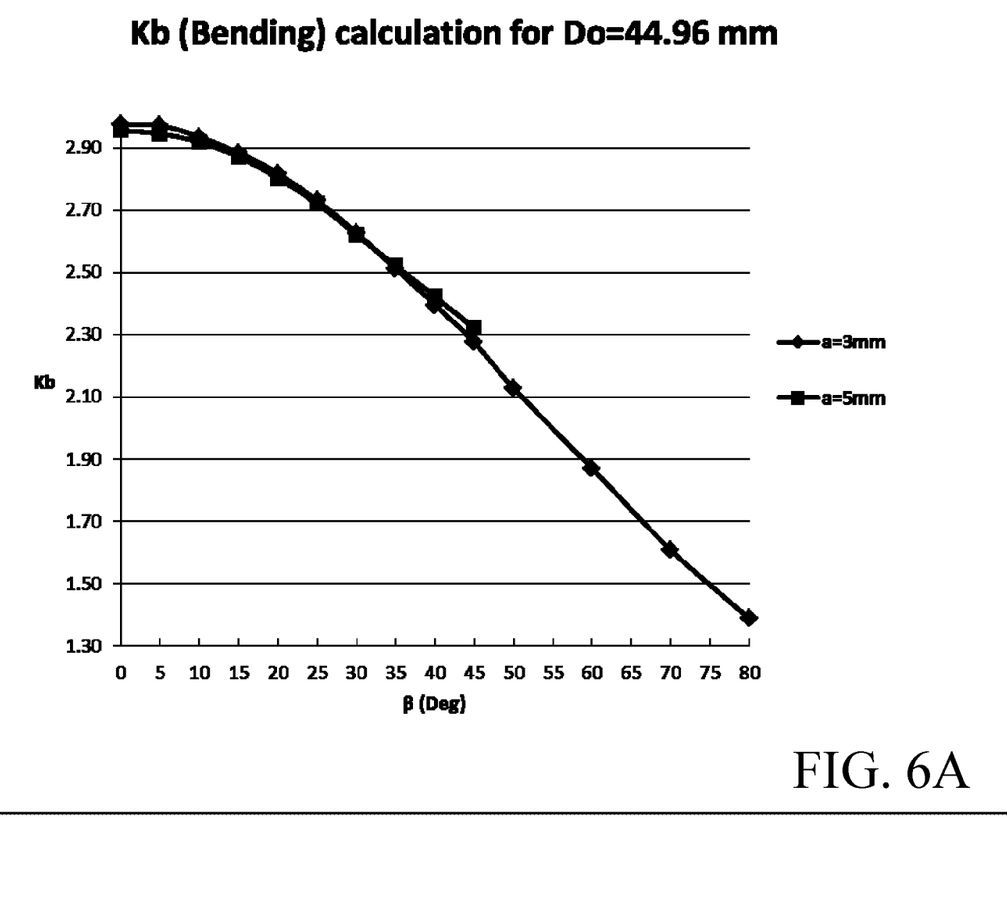
FIG. 6A is a plot of bending stress concentration factor vs. inclination angle of fluid channels of the simulated shafts shown in FIGS. 5A-5B.
Figure 6B:
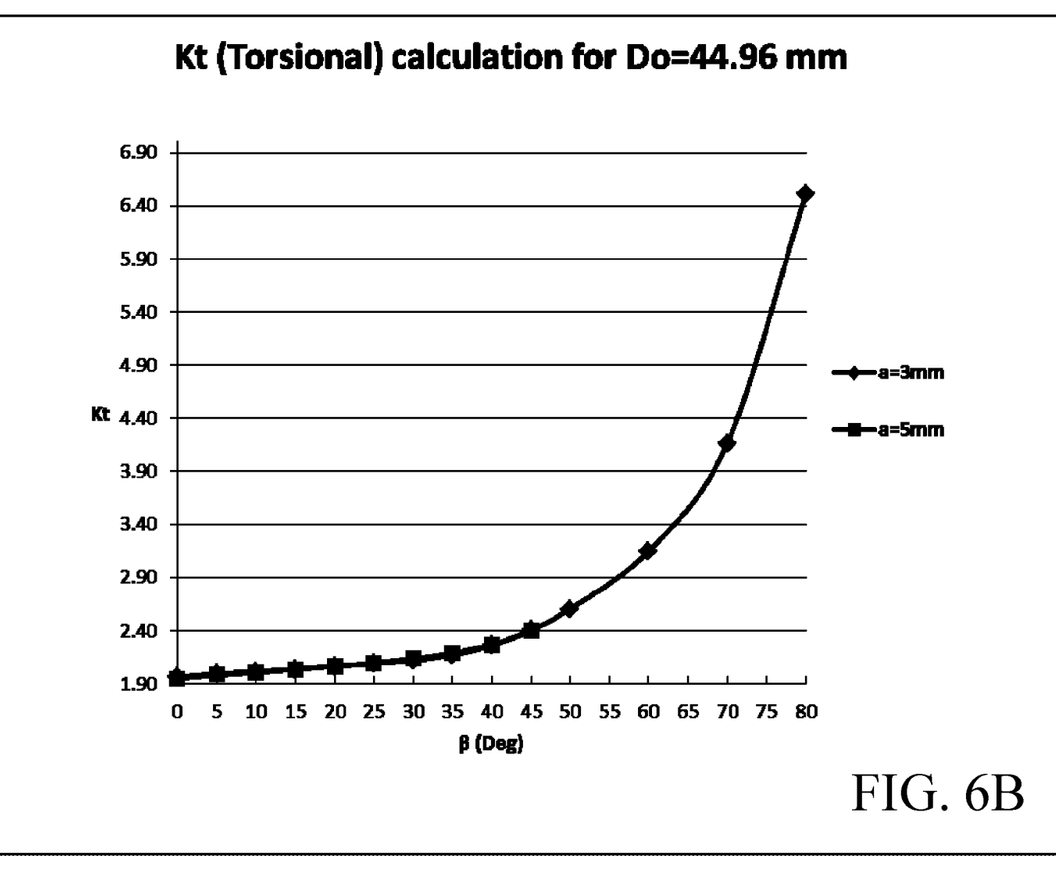
FIG. 6B is a plot of torsional stress concentration factor vs. inclination angle of fluid channels of the simulated shafts shown in FIGS. 5A-5B.

FIGS. 6A-6B are plots of bending and torsional stress concentration factors Kb, Kt at increasing inclination angles $\beta_L$ for shafts 210 having fluid channels 214 with diameters $D_L$ of 3 mm and 5 mm. As shown in FIG. 6A, the bending stress concentration factor $K_b$ reduces from between 2.9 and 3.0 to about 2.3 as the angle of inclination $\beta_L$ increases from 0 to 45 degrees for both the 3 mm and the 5 mm fluid channels 214. For the 3 mm fluid channel 214, the bending stress concentration factor $K_b$ further reduces from about 2.3 to about 1.4 as the angle of inclination $\beta_L$ further increases from 45 to 80 degrees. Accordingly, benefits in reducing the bending stress concentration factor Kb may be achieved by increasing the angle of inclination of the fluid channel 214. Furthermore, small improvements to the bending stress concentration factor Kb have been correlated to large improvements in bending fatigue life. Thus, significant benefits in bending fatigue life may be expected by increasing the angle of inclination of the fluid channel 214.

As shown in FIG. 6B, the torsional stress concentration factor Kt increases from between 1.9 and 2.0 to approximately 2.4 for both diameters of the fluid channels 214 as the angle of inclination $\beta_L$ increases from 0 to 45 degrees. For the 3 mm fluid channel 214, the bending stress concentration factor $K_t$ further increases from approximately 2.4 to above 6.4 as the angle of inclination $\beta_L$ further increases from 45 to 80 degrees.

Accordingly, detriments of increased torsional stress concentration factor Kt may be a consequence of increasing the angle of inclination of the fluid channel 214, which may also lead to reducing torsional fatigue life.

Depending on the application, however, a tradeoff of increased torsional stress concentration factor Kt (and, thereby, reduced torsional fatigue life) may be acceptable for the benefit of reduced bending stress concentration factor (and, thereby, increased bending fatigue life). For example, the overall fatigue life of a primary shaft in a transfer case may normally be limited by its bending fatigue life due to load reversals on the primary shaft (e.g., while load is applied in a substantially constant direction, the primary shaft rotates relative thereto). As such, an increase to the bending fatigue life, while reducing torsional fatigue life, may still result in an increase in overall fatigue life.

Figure 7A:
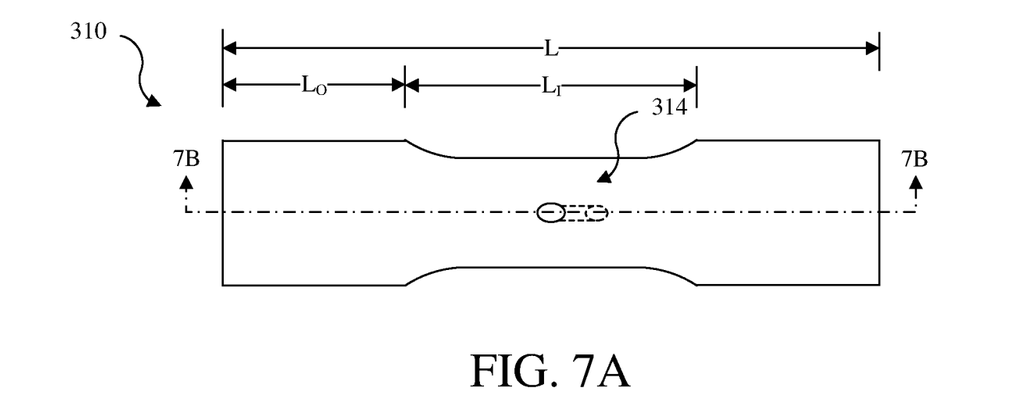
FIG. 7A is a top view of a test shaft with hidden features depicted in phantom.
Figure 7B:
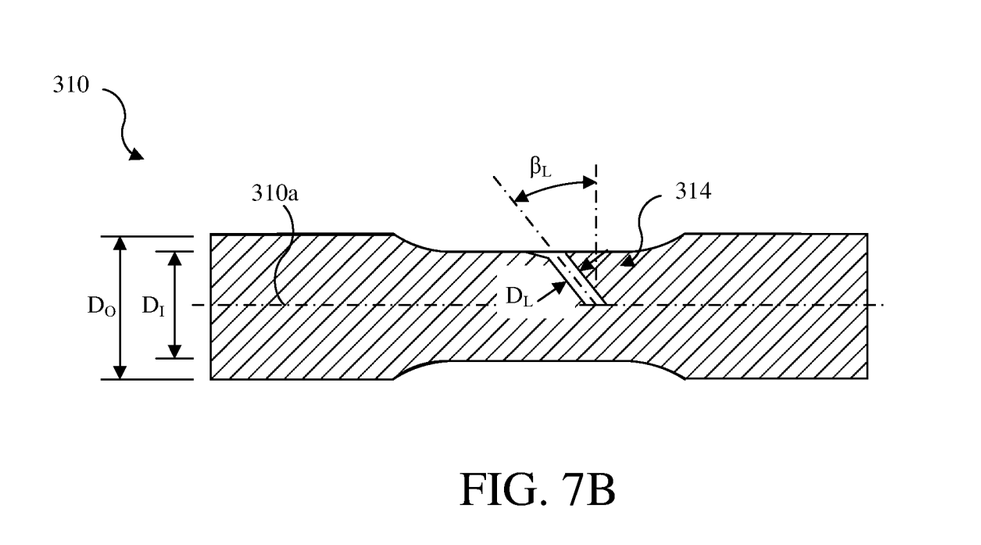
FIG. 7B is a cross-sectional view of the test shaft taken along line 7B-7B in FIG. 7A.
Figure 8:
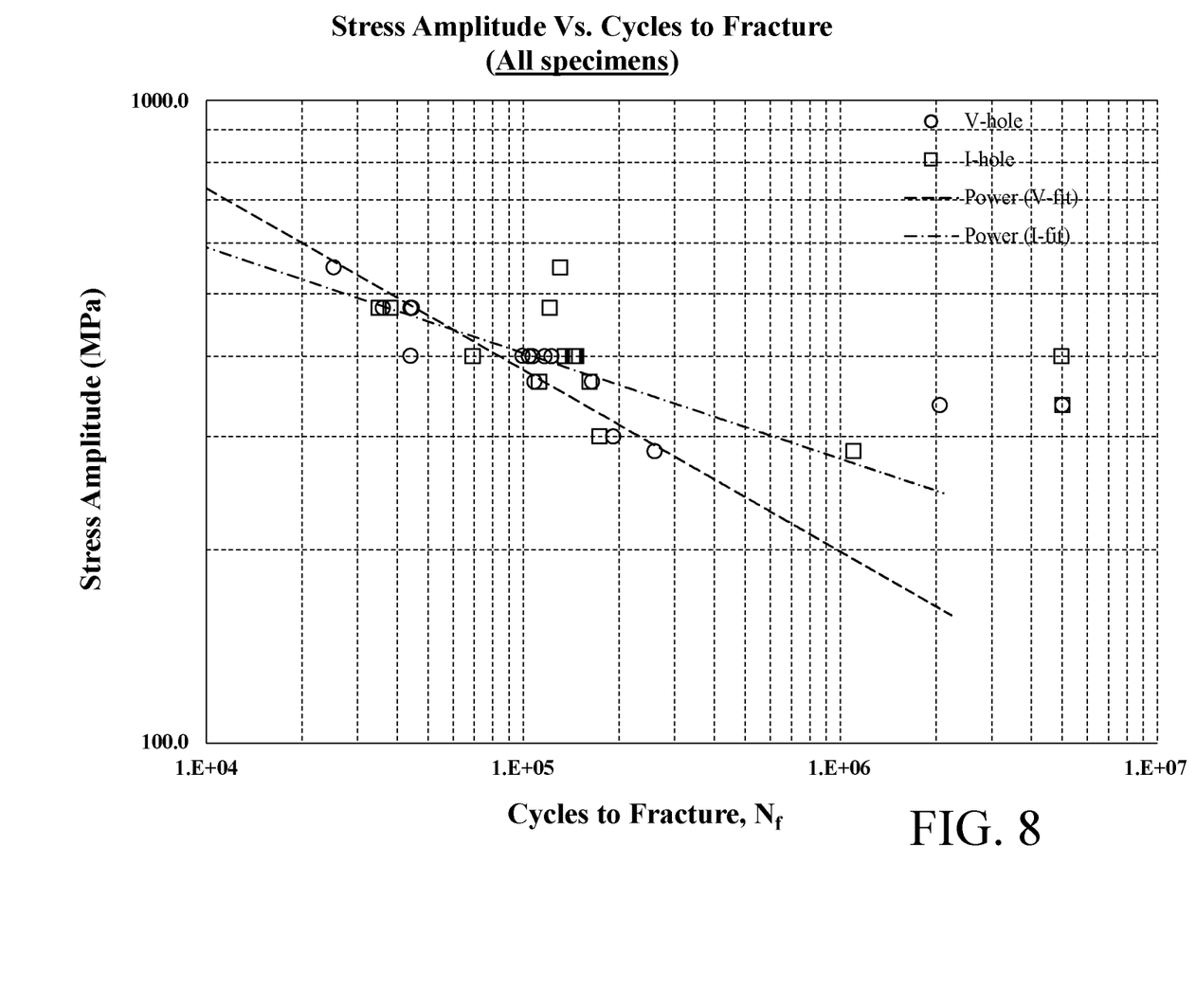
FIG. 8 is an S-N plot of stress amplitude (MPa) vs. cycles to fracture of test shafts for rotating bending fatigue.

Referring to FIGS. 7A-8, test data also indicates that inclined fluid channels can increase fatigue life over perpendicular fluid channels. More particularly, rotating bending fatigue testing was performed on test shafts 310. The test shafts were configured as normalized round bar depicted schematically in FIGS. 7A and 7B. The test shafts 310 were formed of AISI 1050 steel and after machining a hole 314 (e.g., bore) were heat treated to a hardness of 53 HRC. Each test shaft 310 is a solid shaft with an overall length L of approximately 112 mm that includes an inner gage section and outer shoulder sections. The inner gage section has a length $L_1$ of approximately 40.6 mm and a diameter Di of approximately 9.5 mm. The outer shoulder sections have lengths $L_0$ of approximately 35.6 mm and diameters Do of approximately 12.7 mm. Each test shaft 310 includes either a hole 314 that is perpendicular (e.g., vertical) or a hole 314 that is inclined (as shown) with an acute angle of inclination $\beta_L$ of 45 degrees (as defined previously). Each hole 314 has a diameter of approximately $D_L$ 0.63 mm, a depth extending to a central axis 310a of the test shaft 310, and a 60-degree chamfer (approximately 0.47 mm chamfer depth measured axially with the hole 314 that is perpendicular, or 0.094 mm minimum chamfer depth measured perpendicular with the hole 314 that is inclined).

The rotating bending fatigue test includes bending the test shaft 310, such that axes of the shoulder sections have a non-zero angle therebetween, and simultaneously rotating the test shaft 310 with each rotation being considered a cycle. FIG. 8 is an S-N plot illustrating the number of cycles to failure (i.e., fracture) at a given stress amplitude for each of the test shafts 310 in the rotating bending testing. The testing indicated that the test shafts 310 having holes 314 that were inclined lasted longer in high-cycle fatigue strength among at least some stress amplitudes. For example, at a stress amplitude of 400 MPa, test shafts 310 with the holes 314 that were inclined had median cycles to fracture of approximately 144,000, while test shafts 310 with holes 314 that were perpendicular had median cycles to fracture of approximately 105,300.

Figure 9A:
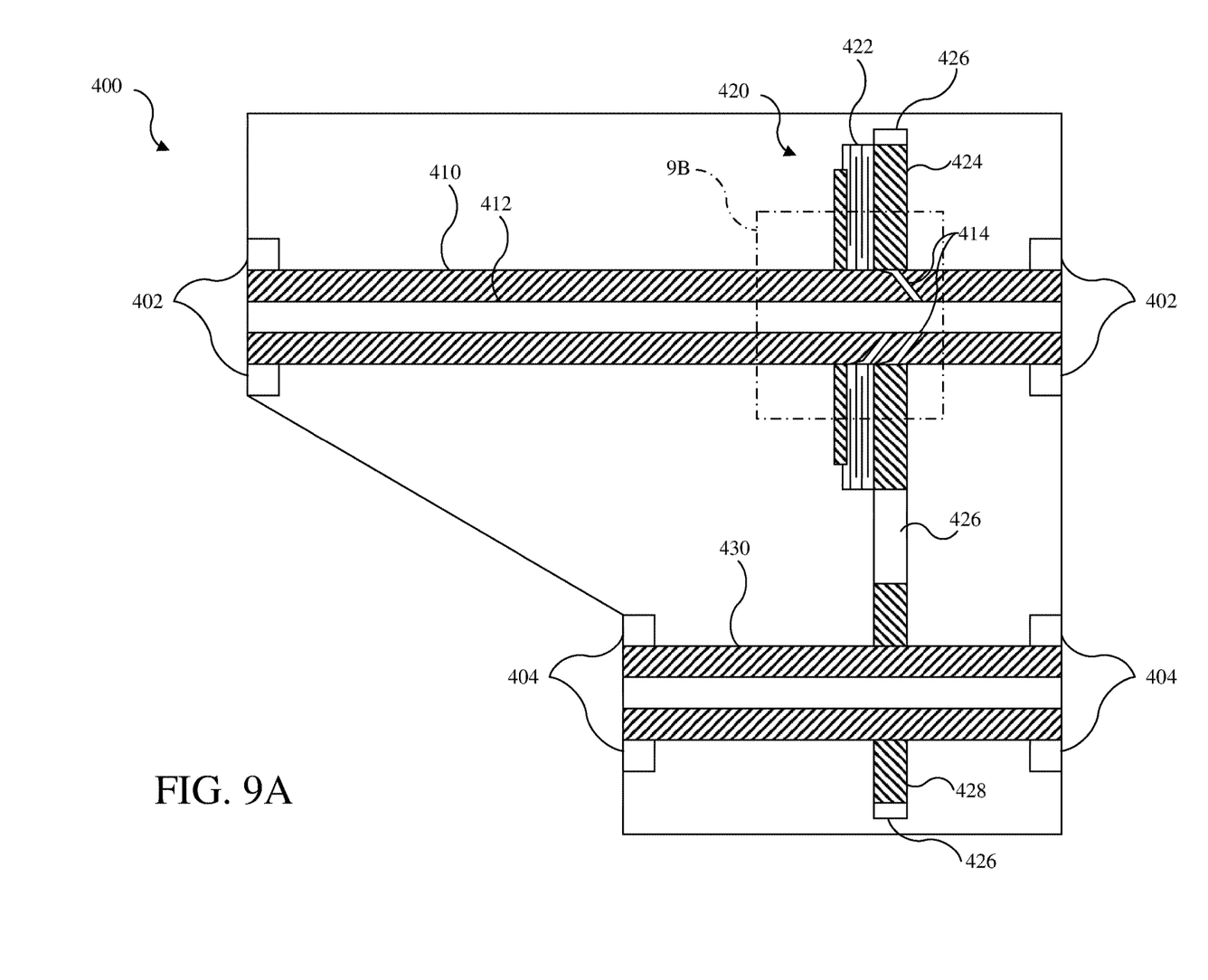
FIG. 9A is a cross-sectional view of an embodiment of a transfer case.
Figure 9B:
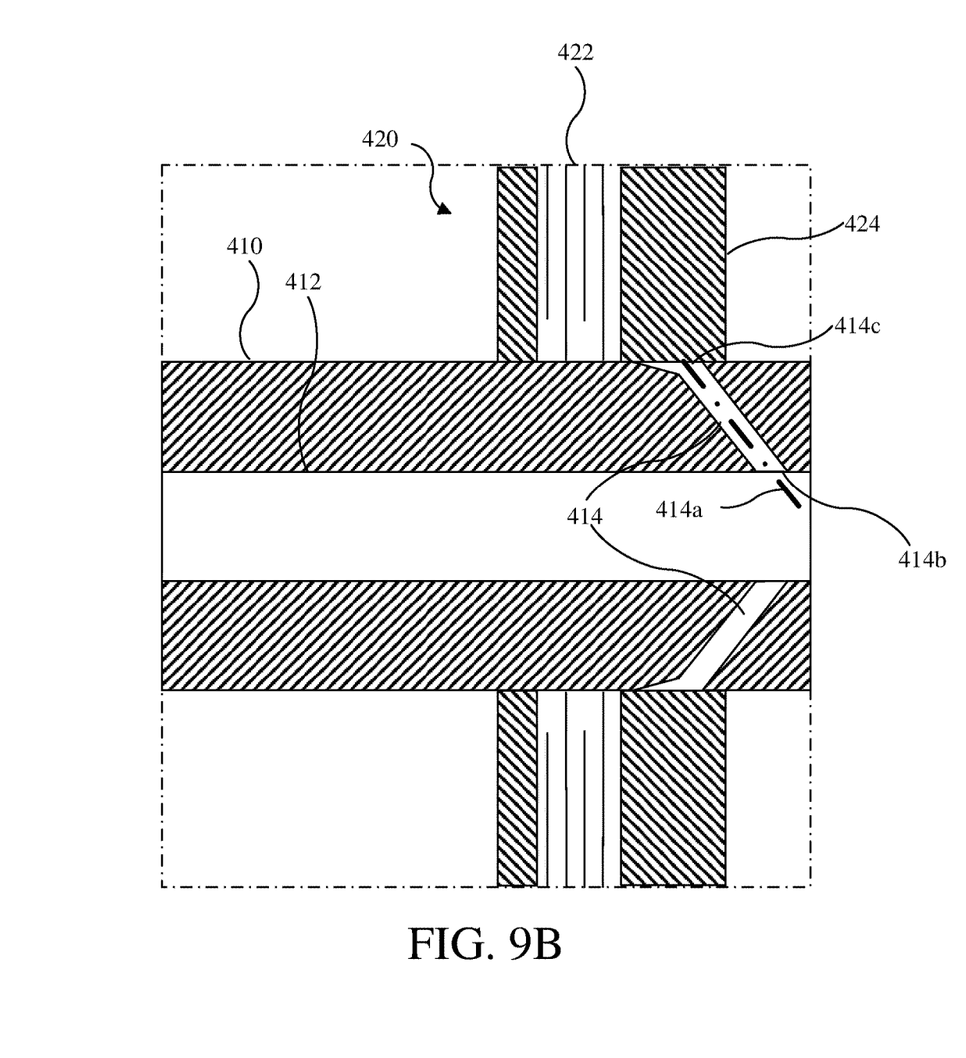
FIG. 9B is a detail view of the transfer case as indicated in FIG. 9A.

Referring to FIGS. 9A-9B, a transfer case 400 is configured in a similar manner to the conventional transfer case 100 described above, but rather than have the primary shaft 110 with the perpendicular fluid channels 114, the transfer case 400 includes a primary shaft 410 (e.g., primary output shaft) having one or more inclined fluid channels 414 in communication (e.g., fluidic communication) with a central channel 412. The primary shaft 410 may be made of steel or other suitable material, which may be unhardened or hardened according to suitable methods.

In the transfer case 400, reference numerals of similar features or components to the transfer case 100 are instead in the 400's. For example, the transfer case 400 additionally includes bearings 402 supporting the primary shaft 410, a secondary shaft 430 (e.g., secondary output shaft) supported by bearings 404, and a torque transfer mechanism 420 (i.e., having a clutch 422, a primary sprocket 424 concentric with the primary shaft 410, a chain 426, and a secondary sprocket 428). For further discussion of these features or components, refer to discussion of the transfer case 100 above.

As shown in the detail view of FIG. 9B, each of the inclined fluid channels 414 has a central axis 414a and includes an inlet 414b and an outlet 414c. As seen in FIG. 9B, in certain embodiments, it is envisioned that the fluid channels 414 may be positioned in diametrical opposition with respect to the central axis 414a. The central axis 414a intersects the axis of the primary shaft 410. The inlet 414b is located at an interior of the primary shaft 410 to be in communication with the central channel 412. The outlet 414c is located at an exterior of the primary shaft 410 to deliver fluid to various components.

Each of the inclined fluid channels 414 is configured to deliver fluid radially outward, for example, to lubricate and/or cool another component or feature associated therewith. For example, one or more of the inclined fluid channels 414 may be associated with the primary sprocket 424, or other location where an elevated or maximum (e.g., peak) bending load is expected. The outlet 414c may be in axial correspondence with the primary sprocket 424, i.e., such that the outlet 414c at least partially overlaps the primary sprocket 424 in an axial direction (e.g., approximately 50% or more of the area of the outlet 414c may overlap the primary sprocket 424). For example, the outlet 414c may be positioned entirely between axial faces (e.g., axial ends) of the primary sprocket 424, such as being substantially centered between the axial faces of the primary sprocket 424 (e.g., such that the central axis 414a of the fluid channel 414 passes through the outlet 414c at an axial midpoint between the axial faces of the primary sprocket 424). Instead or additionally, a plane that is perpendicular to the shaft and in the region (e.g., location) of peak bending loading may pass through the inclined fluid channel 414 (e.g., through the outlet 414c thereof); the plane may or may not pass through the inlet 414b thereof. For transfer cases that instead use gears to transfer torque between a primary shaft and a secondary shaft (i.e., instead of the sprockets 424 and chain), one or more inclined fluid channels may instead be associated with the gear associated with such primary shaft and be similarly positioned relative thereto.

The inclined fluid channel 414 associated with the primary sprocket 424 may extend from the inlet 414b to the outlet 414c toward the clutch 422 (as shown), such that the inlet 414b is positioned axially further from the clutch 422 than is the outlet 414c. Alternatively, the inclined fluid channel 414 may extend from the inlet 414b to the outlet 414c away from the clutch 422, such that the inlet 414b is positioned axially closer to the clutch than the outlet 414c, or axially opposite a portion of the clutch relative to the outlet 414c.

Each inclined fluid channel 414 may, for example, have an inclination angle $\beta_L$, (e.g., an acute angle), of greater than approximately 20 degrees, such as between approximately 40 and 50 degrees (e.g., approximately 45 degrees) whereby the fluid channels 414 extend transversely in relation to a central longitudinal axis of the primary shaft 410. In other applications, the inclined fluid channel 414 may have a steeper inclination angle (e.g., greater than 50 degrees); however, fluid flow may be too significantly hindered at such higher angles and/or manufacturability (e.g., forming the inclined fluid channel 414) may become more difficult and/or costly at steeper angles.

The inclined fluid channel 414 may additionally include the chamfered outlet 414c (e.g., as shown in FIGS. 9A-9B) or include no chamfer.

While the inclined fluid channels 414 have been discussed primarily in conjunction with the primary shaft 410 of the transfer case 400, it should be understood that the secondary shaft 430 may similarly include one or more inclined fluid channels 414 similarly associated with the secondary sprocket 428, and that other rotational shafts in other applications which experience high bending moments may include inclined fluid channels or holes in axial locations experiencing elevated or maximum bending moments. For example, a shaft having one or more inclined fluid channels may be incorporated in another type of drive assembly (e.g., a transmission, gearbox, or other torque transfer device or mechanism in which the shaft is subject to bending load reversals) with the inclined fluid channel 414 being located in a region (e.g., at a location) of the shaft in which peak bending loading occurs. Furthermore, while the primary shaft 410 may be initially designed with the inclined fluid channel 414, previous designs with perpendicular fluid channels may be easily retrofit (e.g., redesigned) with inclined fluid channels for improved fatigue life.

It is to be understood that the present disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Throughout the present disclosure, terms such as "substantially," "approximately," and "generally" should be understood to allow for variations in any numerical range or concept with which they are associated. For example, it is envisioned that the use of terms such as "substantially," "approximately," and "generally" should be understood to encompass variations on the order of 25%, or to allow for manufacturing tolerances and/or deviations in design.

The invention claimed is:

1. A transfer case comprising:
    a primary shaft including a concentric, central channel extending along a first axis for receiving fluid and a fluid channel extending radially outward from the first axis and along a second axis transverse in relation to the first axis and in fluidic communication with the central channel, the second axis extending an acute inclination angle relative to a plane that is perpendicular to the first axis;
    a secondary shaft radially offset from the primary shaft;
    bearings spaced apart axially along the primary shaft and the secondary shaft for rotatably supporting the primary shaft and the secondary shaft; and
    a torque transfer mechanism configured to transfer torque from the primary shaft to the secondary shaft, wherein the torque transfer mechanism includes one of a sprocket or a gear coupled to, and concentric with, the primary shaft, wherein the fluid channel terminates in an outer surface of the primary shaft so as to define an outlet located radially inward of the torque transfer mechanism.

2. The transfer case according to claim 1, wherein the outlet defined by the fluid channel is positioned in axial correspondence with the torque transfer mechanism.

3. The transfer case according to claim 2, wherein the torque transfer mechanism defines opposing ends spaced axially along the primary shaft, the outlet defined by the fluid channel being positioned between the opposing ends of the torque transfer mechanism.

4. The transfer case according to claim 3, wherein the outlet defined by the fluid channel is positioned approximately equidistant between the opposing ends of the torque transfer mechanism.

5. The transfer case of claim 1, wherein the inclination angle is greater than approximately 20 degrees.

6. The transfer case of claim 5, wherein the inclination angle is between approximately 40 degrees and approximately 50 degrees.

7. The transfer case of claim 6, wherein the inclination angle is approximately 45 degrees.

8. The transfer case of claim 1, wherein the fluid channel includes a first fluid channel and a second fluid channel, the first and second fluid channels defining identical inclination angles.

9. The transfer case of claim 8, wherein the first and second fluid channels are positioned in diametrical opposition with respect to the first axis.

10. A transfer case comprising:
an output shaft defining a central longitudinal axis having a central channel for receiving a fluid and including a fluid conduit extending radially outward from and in communication with the central channel terminating in an outer surface of the output shaft to define an outlet, the fluid conduit extending at an acute inclination angle with respect to a plane perpendicular to the central longitudinal axis; and
a torque transfer mechanism in mechanical cooperation with the output shaft, the torque transfer mechanism including one of a sprocket or a gear selectively coupled to the output shaft by a clutch, and the sprocket or the gear defining opposing first and second faces spaced axially along the central longitudinal axis, the output shaft being supported by a first bearing and a second bearing positioned on opposite sides of the torque transfer mechanism.

11. The transfer case of claim 10, wherein the inclination angle is greater than approximately 20 degrees.

12. The transfer case of claim 11, wherein the inclination angle is between approximately 40 degrees and approximately 50 degrees.

13. The transfer case of claim 10, wherein the outlet of the fluid conduit is positioned between the first and second bearings.

14. The transfer case of claim 13, wherein the outlet of the fluid conduit is positioned between the first and second faces of the torque transfer mechanism.

15. The transfer case of claim 14, wherein the outlet of the fluid conduit is positioned approximately equidistant between the first and second faces of the torque transfer mechanism.

16. The transfer case of claim 10, wherein the fluid conduit includes a first fluid conduit extending at a first acute inclination angle with respect to the plane and a second fluid conduit extending at a second acute inclination angle with respect to the plane, the first and second inclination angles being identical.

17. The transfer case of claim 16, wherein the first and second fluid conduits are positioned in diametrical opposition with respect to the central longitudinal axis.

18. A drive assembly comprising:
a shaft configured to be rotated by an engine or a transmission for transferring torque and having a concentric, central channel extending along a longitudinal axis of the shaft for receiving and distributing fluid, the shaft supporting a torque transfer mechanism and including an inclined fluid channel in a region of peak bending loading of the shaft adjacent to an interface between the torque transfer mechanism and the shaft, the fluid channel defining an inlet, extending radially outward, and terminating in an outer surface of the shaft to define an outlet spaced axially from the inlet along the shaft.

19. The drive assembly of claim 18, wherein the shaft is configured and dimensioned, and the fluid channel is positioned, such that a plane extending in perpendicular relation to the shaft in the region of peak bending loading passes through the inclined fluid channel.

20. The drive assembly of claim 19, wherein the shaft is configured and dimensioned, and the fluid channel is positioned, such that the plane passes through the outlet of the fluid channel but not the inlet of the fluid channel.

* * * * *